United States Patent [19]

Bankes et al.

[11] 4,146,166
[45] Mar. 27, 1979

[54] SIMULTANEOUS SOLDERING OF A PLURALITY OF DEVICES

[75] Inventors: Robert B. Bankes; John W. Grubb, both of Reading, Pa.

[73] Assignee: Western Electric Co., Inc., New York, N.Y.

[21] Appl. No.: 873,579

[22] Filed: Jan. 30, 1978

[51] Int. Cl.² .................................... B23K 37/04
[52] U.S. Cl. ............................ 228/180 R; 228/212; 29/760
[58] Field of Search ............... 228/179, 180 R, 212; 29/757, 760

[56] References Cited

U.S. PATENT DOCUMENTS

| 1,456,506 | 5/1923 | Leveridge | 29/760 X |
| 2,699,133 | 1/1955 | Ames et al. | 29/760 |
| 3,286,339 | 11/1966 | Kennard et al. | 228/212 X |
| 3,310,867 | 3/1967 | Ehrat et al. | 29/760 X |
| 3,904,102 | 9/1975 | Chu et al. | 228/180 R |
| 4,074,420 | 2/1978 | Lofdahl | 228/180 R X |

Primary Examiner—C. W. Lanham
Assistant Examiner—K. J. Ramsey
Attorney, Agent, or Firm—R. Y. Peters; G. W. Houseweart

[57] ABSTRACT

In making diode bridges 16, it is desirable to solder a plurality of such bridges simultaneously. To accomplish this a plurality of diodes 10 are held by a portion of one lead each in a cantilevered fashion in each of four in-line racks 38, 40, 50 and 52. The four racks 38, 40, 50 and 52, with diodes 10 extending therefrom, are held at a fixed angle and fixed spacing with respect to each other to interleave the diode leads 14 and form channels. Solder wire 62 is placed in each of the channels. The diodes 10 and the solder wires 62 are then placed into either a heated gas or heated saturated vapor to melt the solder at the crosspoints 60 of the leads 14. Troughs 64 are provided adjacent the crosspoints 60 to catch any solder runoff which occurs during the melting.

6 Claims, 3 Drawing Figures

SIMULTANEOUS SOLDERING OF A PLURALITY OF DEVICES

TECHNICAL FIELD

This invention relates generally to simultaneously soldering a plurality of devices to one another. More particularly, this invention relates to making a plurality of diode bridges simultaneously by using a heated gas or a heated saturated vapor.

BACKGROUND ART

In conventional soldering operations, devices are individually soldered to one another by hand using a soldering iron. For example, in manufacturing diode bridges the diodes are laid into a holder and the individual crosspoints are then each hand soldered. This is quite time consuming since it requires four individual soldering operations for each diode bridge.

Hand-soldering diode bridges also generally give poor yields when used with unencapsulated diodes having leads soldered to the semiconductor diode chip. The reason for this is that the solder joint at the chip will frequently melt and open during the soldering of the leads. For example, a typical diode bridge has a 95% tin-5% lead solder joint at the chip and a 60% tin-40% lead solder for the leads. In this case, the solder at the chip joint has a melting temperature approximately 175° higher than the solder at the leads. But the inability to accurately control the temperature imparted to the diode chip joint by the soldering iron frequently causes the solder at the chip to melt. This is especially a problem if the leads are small and good heat conductors or if the leads must be soldered close to the chip.

Recently, methods have been developed for soldering diode bridges by placing them into a plastic nest and inserting a solder preform at each of the four corners of the bridge. The bridge is then inserted into a hot air or condensation soldering oven to melt the solder preform at the corners. Although this technique is an improvement over the hand soldering method, it is still time consuming since four solder preforms must be carefully placed for each diode bridge, one preform for each corner. And the preforms must be so maintained prior to and during the melting of the preform.

DISCLOSURE OF THE INVENTION

It is therefore an object of the present invention to provide new and improved methods of and apparatus for simultaneously soldering a plurality of articles to one another.

Another object of the present invention is to provide new and improved methods of and apparatus for simultaneously soldering a plurality of diode bridges together without the need for individual solder preforms for each corner of every bridge.

A further object of the present invention is to provide new and improved methods of and apparatus for simultaneously soldering a plurality of diode bridges together wherein the diodes have unencapsulated semiconductor chips soldered to the leads.

With these and other objects in view, the present invention contemplates new methods of simultaneously soldering a plurality of devices to one another by placing a lead of each device into an opening in one of a plurality of carriers so that each device extends from one of the carriers in a cantilever position. The carriers are then held at a fixed angle with respect to one another so that each device extending from the carrier forms a crossover point with at least one other device. Solder wire is then located adjacent to each of the crossover points. The devices and the solder are then inserted into a heated gas which melts the solder at the crossover points.

The invention further contemplates an apparatus for simultaneously soldering a plurality of devices to one another. To this end, a plurality of carriers are provided having at least one opening for receiving a lead of the device to hold the device extending from the carrier in a cantilever position. Equipment for holding the carriers at a fixed angle is provided so that the devices extending from the carriers form a crossover point with at least one other device. Solder is then located closely adjacent to each of the crossover points. Other equipment is provided for subjecting the devices and the solder to a heated gas to melt the solder at each crossover point.

BRIEF DESCRIPTION OF THE DRAWING

Other objects and advantages of the present invention may be more clearly understood by reference to the following detailed description and drawing wherein.

BEST MODE FOR CARRYING OUT THE INVENTION

Diode Bridge

Figure 1:
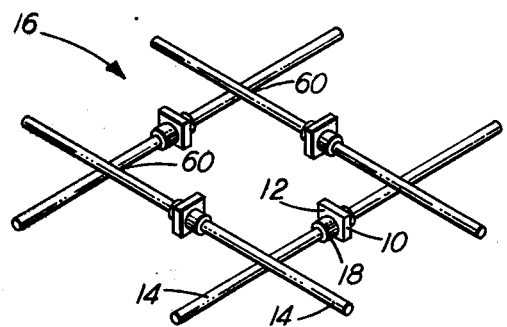
FIG. 1 is a perspective view of a diode bridge made up of four axially leaded diodes soldered to one another by their leads.

Referring now to the drawing and in particular to FIG. 1, a plurality of devices are shown which may be soldered together in accordance with the invention. These devices may, for example, be diodes 10. Each of the diodes 10 has a semiconductor chip 12 and leads 14 extending axially from either side of the chip 12. As shown by FIG. 1, four of the diodes 10 may be soldered together by their leads 14 to form a bridge designated generally by 16.

Each of the axial leads 14 has an enlarged portion 18 which is used to contact the semiconductor chip 12. This allows for better electrical contact and for a larger surface to solder the semiconductor chip 12 to each of the axial leads 14. Typically, a 95% tin-5% lead solder is used to solder the semiconductor chip 18 to the leads 14.

Figure 2:
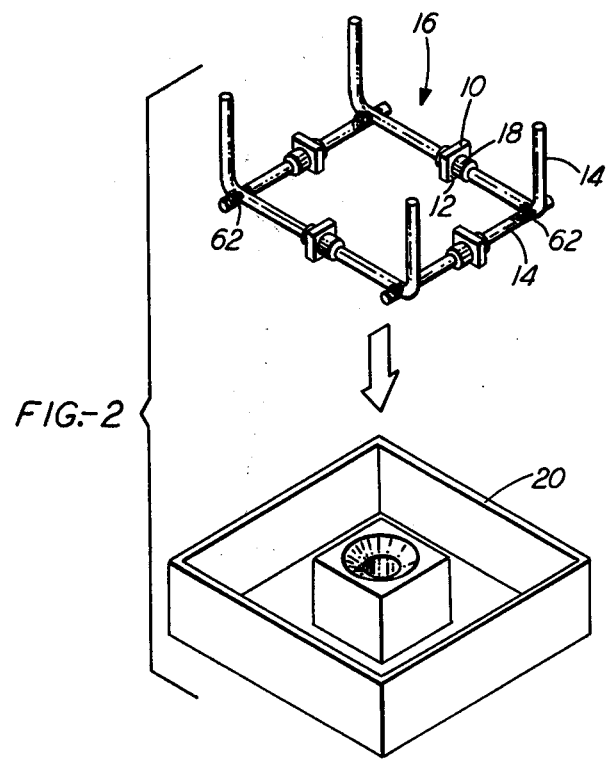
FIG. 2 is an exploded view showing the manner in which the diode bridge is bent and inserted into a protective plastic nest.

FIG. 2 shows a diode bridge 16 after its leads 14 have been trimmed and bent for insertion into a plastic nest 20. After the diode bridge 16 has been inserted into the plastic nest 20, the nest is filled with an epoxy (not shown). This epoxy adequately protects the diodes 10, and they therefore do not need to be separately encapsulated prior to insertion into the nest 20.

Holding Rack

Figure 3:
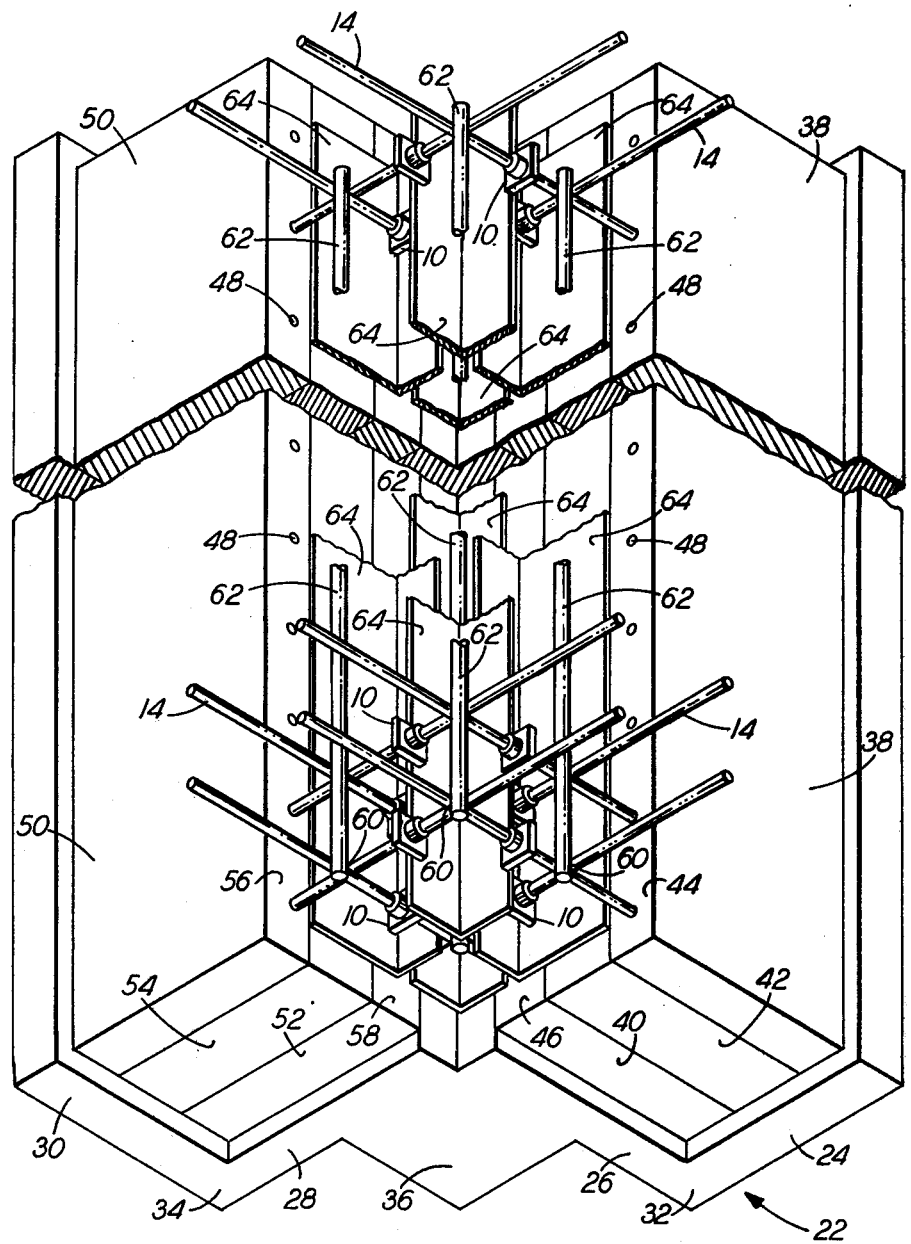
FIG. 3 is a perspective view of a holding rack for making diode bridges in accordance with the present invention.

Referring now to FIG. 3, a base designated generally as 22 is shown having four walls 24, 26, 28 and 30 coupled serially together so that the base 22 has a W-shape. Each of the walls 24, 26, 28 and 30 is perpendicular to its adjoining wall. The walls 24 and 26 form a right V-shaped portion 32 of the base 22. Similarly, the walls 28 and 30 form a left V-shaped portion 34 of the base 22. A support 36 holds the right V-shaped portion 32 and the left V-shaped portion 34 together.

A pair of diode holding carriers or racks 38 and 40 are placed into the right V-shaped portion 32. A spacer 42 lies between the diode holding racks 38 and 40 and holds the two racks parallel to one another. Typically, this spacer 42 is made up of extending integral portions of the racks 38 and 40.

The diode holding racks 38 and 40 each have an end surface 44 and 46 respectively, which faces out to the left of the right V-shaped portion 32. A plurality of holes 48 are provided in these end surfaces 44 and 46. When the leads 14 of diodes 10 are placed into the holes 48, the diodes 10 are held in a cantilever fashion from the diode holding rack. In this position the diodes extend to the left of the diode holding racks 38 and 40 and are parallel to one another.

A pair of diode holding carriers or racks 50 and 52, which are similar to the diode holding racks 38 and 40, are placed into the left V-shaped portion with a spacer 54 between them. These diode holding racks 50 and 52 also have end surfaces 56 and 58, respectively, with a plurality of holes 48. However, the end surfaces 56 and 58 of the diode holding racks 50 and 52 face to the right of the left V-shaped portion 34. Thus, diodes 10, which are placed into the holes 48 of the diode holding rack 50 and 52, extend from those racks in a cantilever fashion and intersect at a right angle any diodes from the diode holding racks 38 and 40.

To form diode bridges, one diode extends from each of the diode racks 38, 40, 50 and 52 in such a manner that the diodes 10 extending from the racks 50 and 52 are closely adjacent to the diodes extending from the racks 38 and 40. In this manner, four crosspoints are formed at the four intersecting points of the diode leads 14. This arrangement can be repeated along the end surfaces 44, 46, 56 and 58 so that a plurality of diode bridges 16 are formed simultaneously. In this arrangement the crosspoints 60 at each respective position of the bridges 16 will all lie along a common longitudingal axis.

Soldering the Diode Bridges

With the diodes 10 held in their intersecting position, it is now necessary to solder the leads 14 together. To accomplish this, solder wires 62 are laid longitudinally across a plurality of crosspoints 60 which are along a common longitudinal axis. Since there are four such groups of crosspoints 60 lying along common longitudinal axis, only four solder wires 62 are needed regardless of the number of bridges intended to be made. This gives a significant saving in time over prior methods which required an individual solder preform for each individual crosspoint.

Troughs 64 are placed under each of the crosspoints 60 to catch any solder runoff during the actual soldering operation. This prevents such excess solder runoff from falling into any of the holes 48.

Once the solder wires 62 are in place, the entire assembly of the diodes 10 and solder wires 62 is placed into a soldering oven (not shown). This soldering oven may be any source of heated gas which causes the solder wires 62 to melt by convection heating. Upon melting, the solder from the solder wire 62 flows over the crosspoints 60 of the leads 14 and adheres to the crosspoints 60 by capillary action. When the diode bridges 16 are removed from the soldering oven, the melted solder again solidifies thereby soldering the leads 14 together at the crosspoint 60.

As a preferred embodiment, the soldering is carried out in a condensation soldering oven similar to those shown in U.S. Pat. No. 3,866,307 to R. C. Pfahl, Jr., et. al., U.S. Pat. No. 3,904,102 issued to T. Y. Chu et al., and U.S. Pat. No. 4,032,033 issued to T. Y. Chu et al.. These patents are all assigned to Western Electric Co., Inc., and are hereby incorporated by reference.

In using condensation soldering as taught by the above patents, a liquid is continuously boiled to establish a body of hot saturated vapor. This vapor will condense onto the diodes 10 and the solder wires 62 causing the hot saturated vapor to give up its latent heat vaporization to the diodes 10 and the solder wires 62. In this manner the temperature of the solder wire 62 is very quickly raised to the temperature of condensation. The temperature of condensation is always the same for a given vapor provided the ambient conditions are controlled to remain constant.

Since the temperature in a condensation soldering operation can be carefully controlled, this method offers the great advantage of being able to use the saturated vapor to melt the solder at the crosspoint 60 while not melting the solder at the semiconductor chips 12. For example, the solder wire 62 can be chosen to be of a material having a melting temperature of approximately 400° F. Typically, a 60% tin-40% lead solder is used. The saturated vapor can be formed from a fluorocarbon liquid such as that sold by E. I. duPont Nemours Company under the trademark FREON E5. This fluorcarbon has a condensation temperature of approximately 425° F. at atmospheric pressure.

The solder used at the semiconductor chips 12 can be chosen to have a melting temperature of approximately 550° F. Thus, when the diode bridge 16 and solder wire 62 are inserted into the condensation soldering oven, the temperature of the solder wires is quickly brought up to the vapor temperature. This melts the solder wire 62. At the same time the solder at the semiconductor chips 12 will remain unmelted.

It should also be noted that because the condensation soldering technique quickly brings the temperature up to the condensation temperature, there is no need for long exposure to the heat. Such long exposure frequently causes problems in other types of soldering.

Preferably, the base 22 is arranged so that the right V-shaped portion 32 and the left V-shaped portion 34 define the elongated horizontal channels. This means that the solder wire 62 and the troughs 64 are also horizontal. Such a horizontal arrangement eliminates the need for any added holding fixtures since the solder wire 62 and the trough 64 can then simply rest on the crossed diode leads 14. However, if oven space requires a different sort of arrangement, the base 22 can be arranged in any orientation. In such a case, additional holding fixtures may be required for holding the troughs 64 and the solder wires 62. Any conventional holding means such as pins, clamps or brackets could be used.

Although this invention has been described in terms of making diode bridges, the invention is in no way intended to be limited solely to such diode bridges. On the contrary, the principles of the invention could be used for soldering any type of leaded device together. The invention is also in no way limited to merely soldering four devices together since it would be equally useful for a smaller or greater number of devices simultaneously soldered to one another.

Furthermore, the invention is in no way limited by the type of solder or heated gas which is used. Any type of conventional solder suitable to solder the leads 14 together may be used. Also, any type of heated gas, or conceivably heated liquid, may be used provided it is satisfactory to melt the solder at the crossover point 60 without melting the solder at the diode chips 12.

Although the invention is described in terms of holding the diodes in a cantilever position, it is to be understood that the free ends of the diodes could be held by a clamping fixture to give better alignment. Such clamping fixtures could be spring biased with respect to one another to draw the diode leads into better contact with one another.

It is to be understood that the above-described arrangements are simply illustrative of the application of the principles of this invention. Numerous other arrangements may be readily devised by those skilled in the art which embodies the principles of the invention and falls within its spirit and its scope.

What is claimed is:

1. A method of simultaneously soldering a plurality of devices to one another, wherein each device has a body portion and a plurality of leads extending from said body portion, comprising:
    placing a lead of each device into an opening in one of a plurality of carriers so that each device extends from one of the carriers in a cantilever position;
    holding the carriers at a fixed angle with respect to one another so that each device extending from the carriers forms a crosspoint with at least one other device;
    locating solder adjacent to each crosspoint;
    melting the solder at the crosspoints; and
    allowing the solder to solidify to interconnect the device.

2. The method of claim 1, wherein a plurality of devices extend parallel to one another from each carrier such that a plurality of crosspoints are formed along a longitudinal axis when the carriers are held at a fixed angle with respect to one another, the method further comprising:
    placing a solder wire adjacent to the crosspoints and along the longitudinal axis formed by the crosspoints.

3. A method of simultaneously condensation soldering a plurality of devices to one another, wherein each device has a body portion, comprising:
    placing a lead of each device into an opening in one of a plurality of carriers so that each device extends from one of the racks in a cantilever position;
    holding the carriers at a fixed angle with respect to one another so that each device extending from the carriers forms a crosspoint with at least one other device;
    locating solder closely adjacent to each crosspoint;
    inserting the devices and solder into saturated vapor so that the saturated vapor condenses on the devices and the solder thereby releasing the latent heat of vaporization to heat the devices and the solder to an elevated temperature to melt the solder at the crosspoints, and
    allowing the solder to solidify to interconnect the devices.

4. The method of claim 1, wherein the solder is melted by saturated vapor which condenses on the devices and the solder thereby releasing the latent heat of vaporization to heat the devices and the solder to melt the solder at the crossover points.

5. A method of making a diode bridge from four axially leaded diodes by simultaneously soldering the leads of the diodes to one another, comprising:
    placing one lead of a first diode into an opening in a first carrier so that the first diode extends from the first carrier in a cantilever position;
    placing one lead of a second diode into an opening in a second carrier so that the second diode extends from the second carrier in a cantilever position;
    placing one lead of a third diode into an opening in a third carrier so that the third diode extends from the third carrier in a cantilever position;
    placing one lead of a fourth diode into an opening in a fourth carrier so that the fourth diode extends from the fourth carrier in a cantilever position;
    holding the first and second carriers spaced from one another so that the first and second diodes extend substantially parallel to one another;
    holding the third and fourth carriers spaced from one another and from the first and second carriers so that the third and fourth diodes extend substantially parallel to one another and substantially perpendicular to the first and second diodes so that four crosspoints are formed at the intersections of the leads of the four diodes;
    locating solder closely adjacent to each crosspoint;
    inserting the diodes and the solder into a heated gas to melt the solder at each crosspoint; and
    allowing the solder to solidify to interconnect the diodes.

6. The method of claim 5, wherein the heated gas is a saturated vapor which condenses on the diodes and the solder thereby heating the diodes and the solder by the latent heat vaporization.

* * * * *